(12) United States Patent
Bhatia et al.

(10) Patent No.: US 11,059,403 B2
(45) Date of Patent: Jul. 13, 2021

(54) REINFORCED REAR SEAT ASSEMBLIES FOR VEHICLES

(71) Applicant: Toyota Motor Engineering & Manufacturing North America, Inc., Plano, TX (US)

(72) Inventors: Vikas Bhatia, South Lyon, MI (US); Luke A. McKean, Ann Arbor, MI (US); Peter J. Moegling, Whitmore Lake, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 42 days.

(21) Appl. No.: 15/982,241

(22) Filed: May 17, 2018

(65) Prior Publication Data

US 2019/0351798 A1 Nov. 21, 2019

(51) Int. Cl.
*B60N 2/68* (2006.01)
*B60R 7/04* (2006.01)
*B29L 31/00* (2006.01)

(52) U.S. Cl.
CPC .............. *B60N 2/686* (2013.01); *B60R 7/043* (2013.01); *B29L 2031/771* (2013.01)

(58) Field of Classification Search
CPC .... B60N 2/686; B60R 7/043; B29L 2031/771
See application file for complete search history.

(56) References Cited

U.S. PATENT DOCUMENTS

| 5,100,204 A | 3/1992 | Makihara et al. |
| 5,320,411 A | 6/1994 | Sera |
| 5,575,533 A | 11/1996 | Glance |
| 5,769,294 A | 6/1998 | Heinz et al. |
| 5,902,009 A * | 5/1999 | Singh ....................... B60N 2/90 297/188.1 |

(Continued)

FOREIGN PATENT DOCUMENTS

| JP | 08019448 A | 1/1996 |
| JP | 1017920B2 B2 | 12/2007 |

(Continued)

OTHER PUBLICATIONS

"Sitting pretty: Car seat concept scores a first"; Michael Legault; www.compositesworld.com/articles/car-seat-cnncept-scores-a-first; Jul. 31, 2014.

*Primary Examiner* — Philip F Gabler
(74) *Attorney, Agent, or Firm* — Dinsmore & Shohl LLP

(57) ABSTRACT

A vehicle includes a cabin and a passenger seat assembly located in the cabin. The passenger seat assembly includes a base support assembly mounted to a floor of the cabin and comprising walls that form a storage compartment. A seat is supported by the base support assembly. The seat includes a seat back frame that supports one or more cushions thereon. A seat base frame supports one or more cushions thereon forming a seat base. The seat base frame is formed as a monolithic, single piece structure from a plastic resin material. The seat base frame has a sitting portion and a raised portion located forward of the sitting portion. The raised portion increases in elevation above the sitting portion to an apex of increased distance from the floor.

14 Claims, 7 Drawing Sheets

(56) References Cited

U.S. PATENT DOCUMENTS

| | | | |
|---|---|---|---|
| 6,012,771 A | | 1/2000 | Shea |
| 6,106,044 A * | | 8/2000 | Schlachter .............. B60R 7/043 |
| | | | 296/37.15 |
| 6,419,313 B1 * | | 7/2002 | Newman .................. B60N 2/70 |
| | | | 296/37.15 |
| 6,682,128 B2 * | | 1/2004 | Carroll, III .............. A62B 1/22 |
| | | | 296/187.03 |
| 6,739,673 B2 * | | 5/2004 | Gupta .................. B60N 2/3013 |
| | | | 297/232 |
| 6,883,854 B2 | | 4/2005 | Daniel |
| 7,731,293 B1 | | 6/2010 | Donovan et al. |
| 9,090,209 B2 * | | 7/2015 | Aguirre .................. B60R 7/043 |
| 9,327,631 B2 | | 5/2016 | Yamaguchi et al. |
| 9,393,889 B2 | | 7/2016 | Yamaguchi et al. |
| 9,403,452 B2 * | | 8/2016 | Subramanian ..... B60N 2/42763 |
| 9,421,915 B2 * | | 8/2016 | Kalergis .................. B60R 7/043 |
| 10,232,788 B1 * | | 3/2019 | Hagedorn ................ B60N 2/90 |
| 10,336,262 B2 * | | 7/2019 | Mozurkewich ........ B60N 2/305 |
| 2006/0119149 A1 * | | 6/2006 | Yoshikawa ........ B60N 2/42718 |
| | | | 297/216.1 |
| 2008/0290555 A1 | | 11/2008 | Kim et al. |
| 2010/0001568 A1 * | | 1/2010 | Trybus ............... B60N 2/42718 |
| | | | 297/312 |
| 2011/0101744 A1 | | 5/2011 | Naughton et al. |
| 2018/0056882 A1 * | | 3/2018 | Osterhoff ............... B60N 2/682 |

FOREIGN PATENT DOCUMENTS

| | | | |
|---|---|---|---|
| JP | 2017087795 A | | 5/2017 |
| KR | 20080000379 A | | 1/2008 |
| KR | 101211847 B1 | | 12/2012 |

\* cited by examiner

US 11,059,403 B2

REINFORCED REAR SEAT ASSEMBLIES FOR VEHICLES

TECHNICAL FIELD

The present specification generally relates to seat assemblies for vehicles and, more specifically, to reinforced rear seat assemblies for vehicles.

BACKGROUND

Trucks, such as pickup trucks, often include both front seat assemblies and rear seat assemblies in their cabins. The front seat assemblies may be bucket-type seats that support a single person, for example, a driver or a single passenger. The rear seat assemblies may be bench-type seats that accommodate multiple passengers side-by-side. Many known seat assemblies are formed of a stamped metal frame that supports cushions thereon. Such metal frames, while formed of a relatively high-strength metal suitable for use in vehicles, can be hard and benefit from relatively thick cushioning to provide added comfort. Further, metal frames can be relatively heavy when compared to other materials and require numerous components.

Accordingly, a need exists for alternative seat assemblies that include a seat frame that is molded as a single-piece monolithic component from a plastic material.

SUMMARY

In one embodiment, a vehicle includes a cabin and a passenger seat assembly located in the cabin. The passenger seat assembly includes a base support assembly mounted to a floor of the cabin and comprising walls that form a storage compartment. A seat is supported by the base support assembly. The seat includes a seat back frame that supports one or more cushions thereon. A seat base frame supports one or more cushions thereon forming a seat base. The seat base frame is formed as a monolithic, single piece structure from a plastic resin material. The seat base frame has a sitting portion and a raised portion located forward of the sitting portion. The raised portion increases in elevation above the sitting portion to an apex of increased distance from the floor.

In another embodiment, a passenger seat assembly includes a base support assembly that mounts to a floor of a vehicle cabin. The base support assembly includes walls that form a storage compartment. A seat is supported by the base support assembly. The seat includes a seat back frame that supports one or more cushions thereon forming a seat back. A seat base frame supports one or more cushions thereon forming a seat base. The seat base frame is formed as a monolithic, single piece structure from a plastic resin material. The seat base frame has a sitting portion and a raised portion located forward of the sitting portion. The raised portion increases in elevation above the sitting portion to an apex of increased distance from the floor.

In another embodiment, a method of forming a passenger seat assembly is provided. The method includes forming a base support assembly that mounts to a floor of a vehicle cabin. The base support assembly includes walls that form a storage compartment. A seat base frame is molded that supports one or more cushions thereon forming a seat base. The seat base frame is formed as a monolithic, single piece structure from a plastic resin material. The seat base frame has a sitting portion and a raised portion located forward of the sitting portion. The raised portion increases in elevation above the sitting portion to an apex. The seat base frame is supported on the base support assembly. The seat base frame is moveable relative to the base support assembly from a closed configuration that closes the storage compartment and allows for seating and an open configuration that exposes the storage compartment.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to vehicles, such as pickup trucks, that include rear seat assemblies including seat frame components that are formed as a single-piece monolithic component from a plastic material. The seat frame components may have a continuous body structure that extends both lengthwise and widthwise to support a seat cushion thereon. The continuous body structure may include support features, such as a raised front portion of increased height and reinforcement ribs formed in the body structure that extend over a length of the seat frame components. The seat frame components may also be pivotally connected to a support structure at pivot locations. The pivoting arrangement allows the seat frame components to be moved from a closed configuration for seating to a raised configuration that exposes a storage bin beneath the seat frame components.

Figure 1:
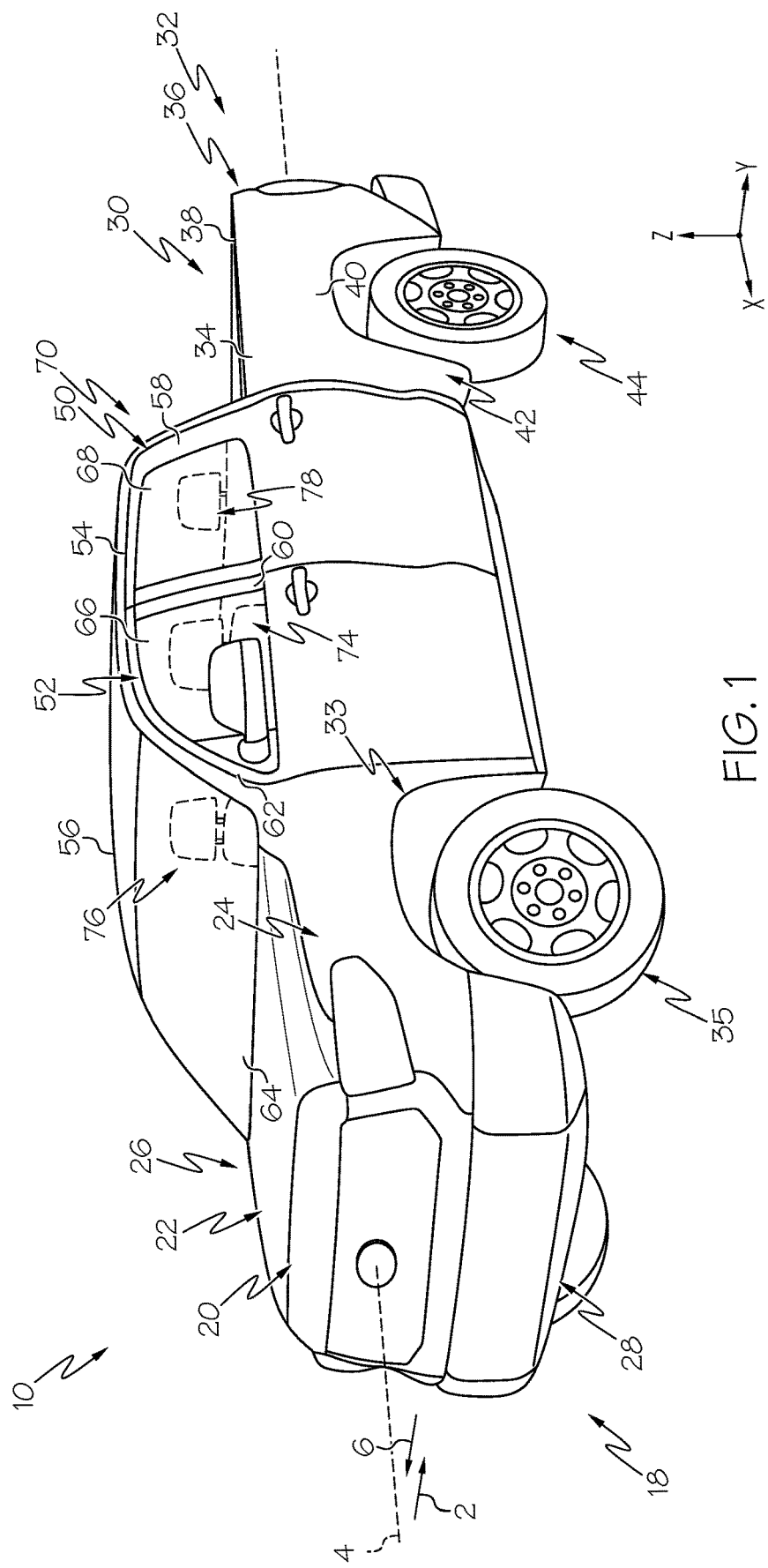
FIG. 1 is a perspective view of a vehicle, according to one or more embodiments shown and described herein.

As used herein, the term "vehicle longitudinal direction" refers to the forward-rearward direction of the vehicle (i.e., in the +/− vehicle X-direction depicted in FIG. 1). The term "vehicle lateral direction" refers to the cross-vehicle direction (i.e., in the +/− vehicle Y-direction depicted in FIG. 1), and is transverse to the vehicle longitudinal direction. The term "vehicle vertical direction" refers to the upward-downward direction of the vehicle (i.e., in the +/− vehicle Z-direction depicted in FIG. 1). Further, the terms "inboard," "inward," "outboard" and "outward" are used to describe the relative positioning of various components of the vehicle. Referring to FIG. 1, the terms "outboard" or "outward" as used herein refers to the relative location of a component in direction 2 with respect to a vehicle centerline 4. The term "inboard" or "inward" as used herein refers to the relative location of a component in direction 6 with respect to the vehicle centerline 4. Because the vehicle structures may be generally symmetrical about the vehicle centerline 4, the direction to which use of terms "inboard," "inward," "outboard" and "outward" refer may be mirrored about the vehicle centerline 4 when evaluating components positioned along opposite sides of the vehicle 10.

Motor vehicles that incorporate elements according to the present disclosure may include a variety of construction methodologies that are conventionally known, including a unibody construction methodology as well as a body-on-frame construction methodology. It should be understood that vehicles that are constructed with body-on-frame or unibody construction may incorporate the elements that are shown and described herein.

While FIG. 1 depicts the vehicle 10 as a pickup truck, it may be recognized that the vehicle 10 may be other vehicle types such as a sport-utility vehicle (SUV), van, and the like in various other embodiments. The vehicle 10 may include an engine compartment 20 located at a front 18 of the vehicle. In some embodiments, the engine compartment 20 may be at least partially enclosed by various vehicle components. Illustrative components that may be used to enclose the engine compartment 20 may include, but are not limited to, a hood assembly 22, one or more fenders 24 and 26, and a front bumper assembly 28. For example, the engine compartment 20 may be enclosed on four sides by the hood assembly 22, the front bumper assembly 28, and the passenger side and driver side fenders 24 and 26 which are attached to front side members that form the sides of the engine compartment 20. The passenger side and driver side fenders 24 and 26 may at least partially overhang wheel wells 33 where front wheels 35 are located. The engine compartment 20 may generally be a hollow cavity beneath the hood assembly 22 that houses various components of the vehicle 10, such as, for example, the engine and/or motor, cooling systems (e.g., a radiator), electrical systems and/or the like. Various other parts and components of the vehicle, such as body panels, bumpers, suspension components, etc. may be attached to the vehicle either in the engine compartment 20 or through the front side members.

The vehicle may further include a truck bed assembly 30 at a rear 32 of the vehicle 10. The truck bed assembly 30 may include side walls 34 and a rear wall 36 that is formed, at least in part, by a moveable tailgate 38 that can be moved from a raised configuration to a lowered configuration. The side walls 34 may be connected to passenger side and driver side fenders 40 that at least partially overhang wheel wells 42 where rear wheels 44 are located.

The vehicle 10 includes a vehicle body 50 that defines a cabin 52 located between the engine compartment 20 and the truck bed assembly 30. The vehicle body 50 includes a pair of side roof rail structures 54 and 56 and various pillar assemblies. The various pillar assemblies are connected to the side roof rail structures 54 and 56 and extend downwardly therefrom in a vehicle vertical direction. These pillar assemblies are generally referred to as C-pillar assemblies 58, B-pillar assemblies 60 and front or A-pillar assemblies 62. The A-pillar assemblies 62 are located toward the forward end of the vehicle 10, generally between a front windshield 64 and front side windows 66. The B-pillar assemblies 60 are located generally between the front and rear side windows 66 and 68. Finally, the C-pillar assemblies 58 are located between the rear side windows 68 and rear window 70. Depending on vehicle type, other pillar assemblies, such as D-pillar assemblies may be located rearward of the C-pillar assemblies (e.g., between rear side windows and rear window).

The vehicle 10 includes a number of seat assemblies located within the cabin 52 of the vehicle 10. In the illustrated example, the vehicle includes a driver seat assembly 74, a front passenger seat assembly 76 and a rear passenger seat assembly 78. The driver seat assembly 74 and the front passenger seat assembly 76 may both be bucket-type seat assemblies that support a single occupant. The rear passenger seat assembly 78 may be a bench-type seat assembly that supports multiple occupants in a side-by-side arrangement.

Figure 2:
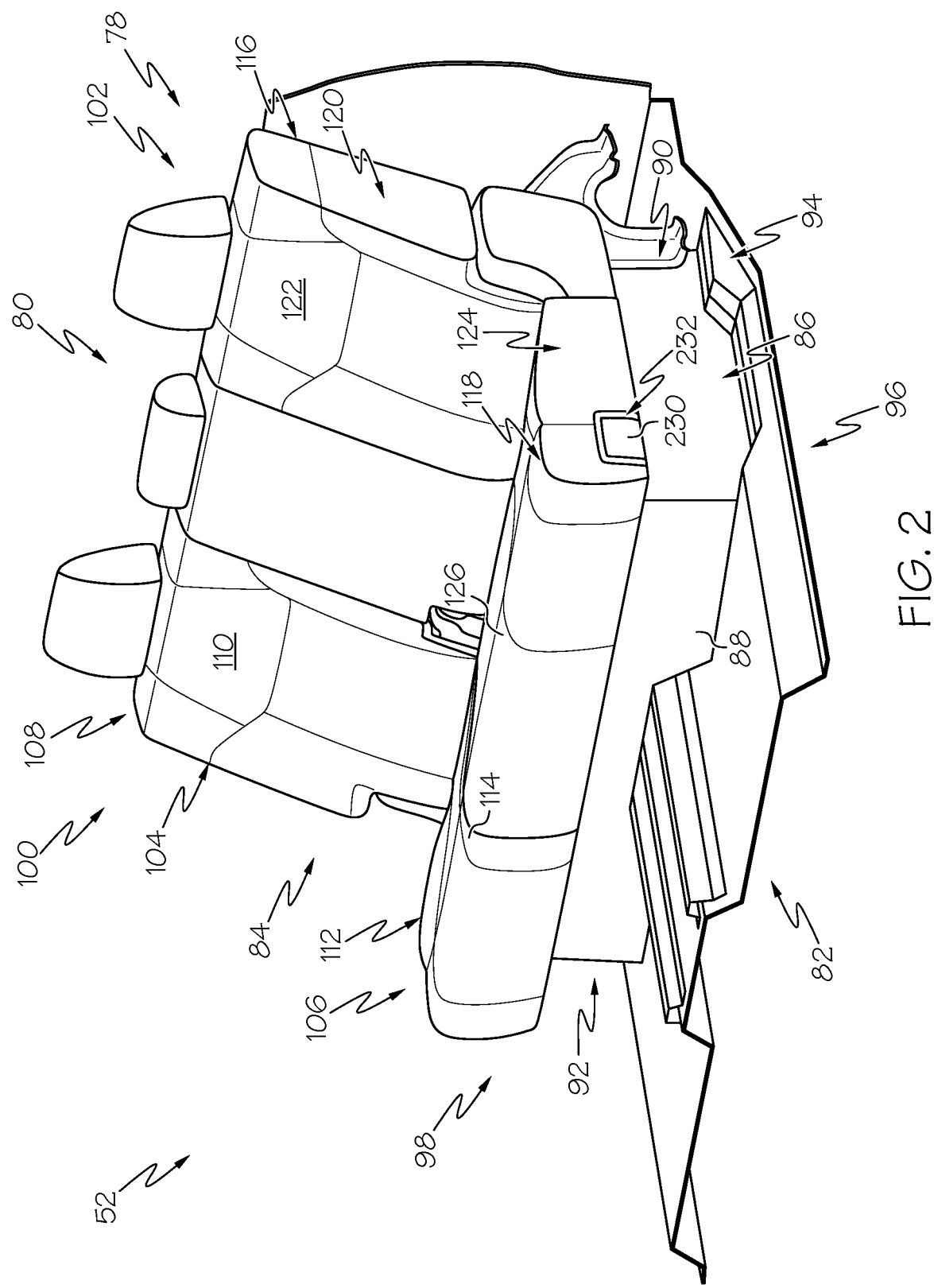
FIG. 2 is a perspective view of a passenger seat assembly for use with the vehicle of FIG. 1, according to one or more embodiments shown and described herein.

Referring to FIG. 2, a rear portion 80 of the cabin 52 is illustrated in isolation that includes the rear passenger seat assembly 78. The cabin 52 is partially defined by a floor 82 to which the rear passenger seat assembly 78 is mounted. The rear passenger seat assembly 78 may include a base support assembly 86 that is mounted to the floor 82 and an adjustable seat portion 84 that is supported by the base support assembly 86 above the floor 82. The base support assembly 86 may include a front wall 88, a rear wall 90 and side walls 92 and 94 that extend between the front and rear walls 88 and 90 forming a somewhat box-shaped compartment upon which the adjustable seat portion 84 rests. As can be seen, the width of the base support assembly 86 extends continuously from a driver side 96 of the vehicle 10 to a passenger side 98 of the vehicle in the vehicle lateral direction.

The adjustable seat portion 84 may include a first seat 100 and a second seat 102 that is adjacent the first seat 100. In the illustrated example, the first seat 100 is a single occupant-type seat including a seat back 104 and a seat base 106. The seat back 104 includes a seat back frame 108 that supports one or more cushions 110 thereon and a seat base frame 112 that supports one or more cushions 114 thereon. In some embodiments, the seat back 104 may be moveable relative to the seat base 106 about a pivot axis to allow the seat back 104 to recline between a fully upright configuration to a fully reclined configuration. The second seat 102 is a multiple occupant-type seat (e.g., two or more occupants) including a seat back 116 and a seat base 118. The seat back 116 includes a seat back frame 120 that supports one or more cushions 122 thereon and the seat base 118 includes a seat base frame 124 that supports one or more cushions 126 thereon. In some embodiments, the seat back 116 may be moveable relative to the seat base 118 about a pivot axis to allow the seat back 116 to recline between a fully upright configuration to a fully reclined configuration.

Figure 3:
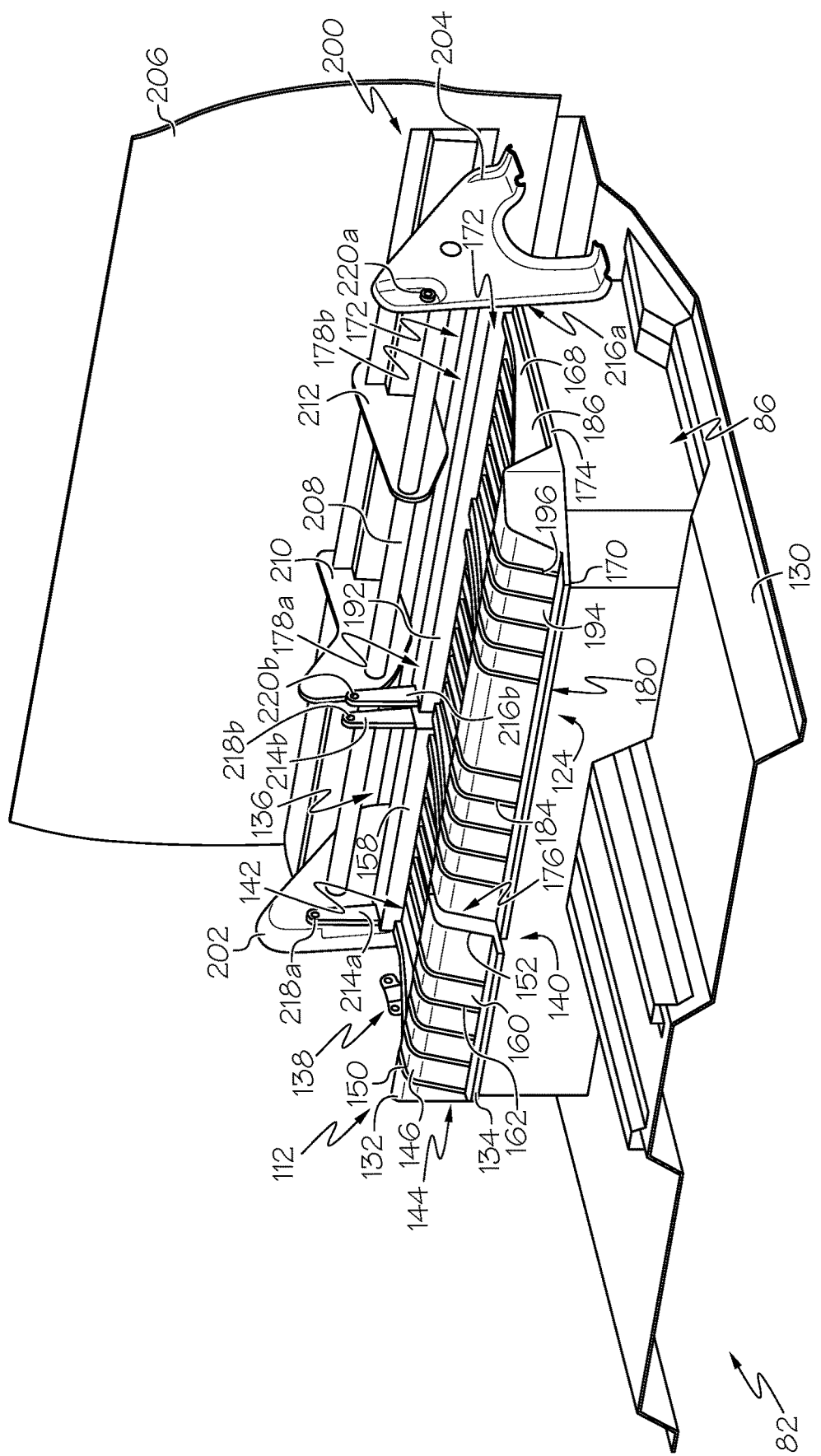
FIG. 3 is another perspective view of the passenger seat assembly of FIG. 2, according to one or more embodiments shown and described herein.

Referring now to FIG. 3, the base support assembly 86 and the seat base frames 112 and 124 are illustrated in isolation connected to an underbody 130 of the floor 82. The seat base frames 112 and 124 may be formed of a plastic resin material that may comprise a reinforced composite plastic material. For example, the plastic may be a reinforced polymer, such as a glass fiber reinforced polypropylene. The seat base frames 112 and 124 may be molded from the plastic resin as a single-piece monolithic structure that forms a foundation for the seat bases 106 and 118.

Referring first to seat base frame 112, the seat base frame 112 includes a frame body 132 that is formed of the reinforced plastic resin material that includes a front edge 134, a rear edge 136 and outboard and inboard side edges 138 and 140 that extend from the front edge 134 to the rear edge 135 forming a somewhat rectangular-shaped seat base. Located between the front edge 134 and the rear edge 136 is a relatively planar sitting portion 142. A raised portion 144 is located forward of the sitting portion 142, generally at a knee location region. The raised portion 144 increases in elevation above the sitting portion 142 to an apex 146 of increased distance from the floor 82. The raised portion 144 provides an anti-submarining feature that opposes sliding movement of the cushion 114 and a seat occupant in a forward vehicle longitudinal direction, for example, in response to a sudden decrease in momentum. From the apex 146, the raised portion 144 decreases in elevation to the front edge 134.

Raised side walls 150 and 152 are located between the side edges 138 and 140 and the sitting portion 142. The raised side walls 150 and 152 increase in elevation to upper edges of increased distance from the floor 82. The raised side walls 150 and 152 provide barriers that resist lateral movement of the cushion 114, for example, in response to an abrupt turn. Similar to the side walls 150 and 152, a raised rear wall 158 may also be provided to resist rearward movement of the cushion 114.

Figure 4:
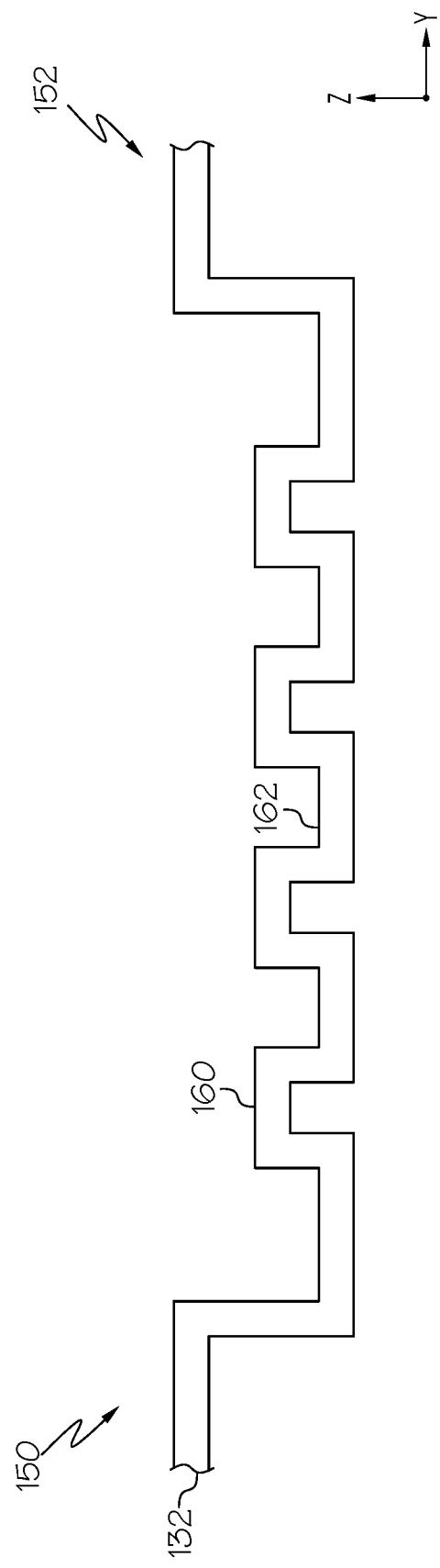
FIG. 4 is a diagrammatic section view of a seat base frame for use with the passenger seat assembly of FIG. 1, according to one or more embodiments shown and described herein.

The seat base frame 112 includes undulations in the form of ribs 160 and valleys 162. Referring briefly to FIG. 4, the ribs 160 extend generally in the vehicle longitudinal direction, between the opposite side walls 150 and 152 of the frame body 132 and are aligned with one another forming a row of the ribs 160 with valleys 162 between the ribs 160 forming an undulating pattern extending in the vehicle transverse direction. While the ribs 160 are illustrated squared or flat in profile and extending upwardly away from the floor 82, the ribs may have a more rounded profile. Instead of a single row of the ribs 160 as shown, there may be multiple rows of longitudinally discontinuous ribs.

Plural valleys 162 serve as downward protrusion portions formed in the frame body 132. Each of the valleys 162 is, as viewed in a cross-section along an orthogonal plane to the vehicle longitudinal direction, formed with a protruding profile where the frame body 132 is lowered toward the floor 82. Each profiled flattened valley 162 is disposed substantially parallel to the underbody 130.

Referring again to FIG. 3, the ribs 160 and the valleys 162 extend continuously from the rear wall 158 to the front edge 134 in the vehicle longitudinal direction. The ribs 160 and valleys 162 extend over both the sitting portion 142 and the raised portion 144. The undulating pattern of the ribs 160 and the valleys 162 provide increased structural support to the seat base frame 112. In some embodiments, a material thickness of the frame body 132 at the sitting portion 142 and the raised portion 144 is substantially constant in both the longitudinal and lateral cross sections. Providing the ribs 160 and valleys 162 can provide increased support without increasing material thickness. In the illustrated example, four ribs 160 are provided; however, there may be more or less than four ribs 160.

Referring now to seat base frame 124, the seat base frame 124 includes a frame body 168 that is also formed of the reinforced plastic resin material that includes a front edge 170, a rear edge 172 and outboard and inboard side edges 174 and 176 that extend from the front edge 170 to the rear edge 172 forming a somewhat rectangular-shaped seat base. Located between the front edge 170 and the rear edge 172 are relatively planar sitting portions 178a and 178b. A raised portion 180 is located forward of the sitting portions 178a and 178b, generally at a knee location region. The raised portion 180 increases in elevation above the sitting portion 178a and 178b to an apex of increased distance from the floor 82. The raised portion 180 provides an anti-submarining feature that opposes sliding movement of the cushion 126 and a seat occupant in a forward vehicle longitudinal direction, for example, in response to a sudden decrease in momentum. From the apex, the raised portion 180 decreases in elevation to the front edge 170.

Raised side walls 184 and 186 are located between the side edges 174 and 176 and the sitting portions 178a and 178b. The raised side walls 184 and 186 increase in elevation to upper edges of increased distance from the floor 82. The raised side walls 184 and 186 provide barriers that resist lateral movement of the cushion 126, for example, in response to an abrupt turn. Similar to the side walls 184 and 186, a raised rear wall 192 may also be provided to resist rearward movement of the cushion 126.

The seat base frame 124 also includes undulations in the form of ribs 194 and valleys 196. The ribs 194 extend generally in the vehicle longitudinal direction, between the opposite side walls 184 and 186 of the frame body 168 and are aligned with one another forming a row of the ribs 194 with valleys 196 between the ribs 194 forming an undulating pattern extending in the vehicle transverse direction, as discussed above.

The ribs 194 and the valleys 196 extend continuously from the rear wall 192 to the front edge 170 in the vehicle longitudinal direction. The ribs 194 and valleys 196 extend over both the sitting portions 178a and 178b and the raised portion 180. The undulating pattern of the ribs 194 and the valleys 196 provide increased structural support to the seat base frame 124.

The seat base frames 112 and 124 are pivotally connected to a seat support structure 200. The seat support structure 200 includes outboard support brackets 202 and 204 located at opposite sides of the adjustable seat portion 84 that can be fastened to the underbody 130 and rear wall 206. A crossbar support 208 extends between the outboard support brackets 202 and 204 in the vehicle lateral direction. A pair of inboard support brackets 210 and 212 may also be provided that supports the crossbar support 208. The inboard support brackets 210 and 212 may be fastened to the rear wall 206.

The seat base frames 112 and 124 each include pivot linkage arms 214 and 216. In particular, the seat base frame 112 includes an outboard pivot linkage arm 214a and an inboard pivot linkage arm 214b. The pivot linkage arm 214a extends outward in the vehicle vertical direction from the raised rear wall 158 and is pivotally connected to the outboard support bracket 202 at a pivot location 218a. The pivot linkage arm 214b also extends outward in the vehicle vertical direction and is pivotally connected to the inboard support bracket 210 at a pivot location 218b. As can be appreciated, the pivot locations 218a and 218b are offset vertically from the rear edge 136 and the sitting portion 142.

The seat base frame 124 includes an outboard pivot linkage arm 216a and an inboard pivot linkage arm 216b. The pivot linkage arm 216a extends outward in the vehicle vertical direction from the raised rear wall 192 and is pivotally connected to the outboard support bracket 204 at a pivot location 220a. The pivot linkage arm 216b also extends outward in the vehicle vertical direction and is pivotally connected to the inboard support bracket 210 at a pivot location 220b. The pivot locations 220a and 220b are offset vertically from the rear edge 172 and the sitting portions 178a and 178b.

The adjustable seat portion 84 is illustrated in FIG. 3 in a fully closed configuration with each of the first seat 100 and the second seat 102 in their respective closed configurations. In the closed configuration, the seat bases 106 and 118 are mated with the base support assembly 86 and the sitting portions 142, 178a and 178b lie in a generally horizontal plane thereby closing a storage volume formed by the base support assembly 86, which will be described in greater detail below.

Figure 5:
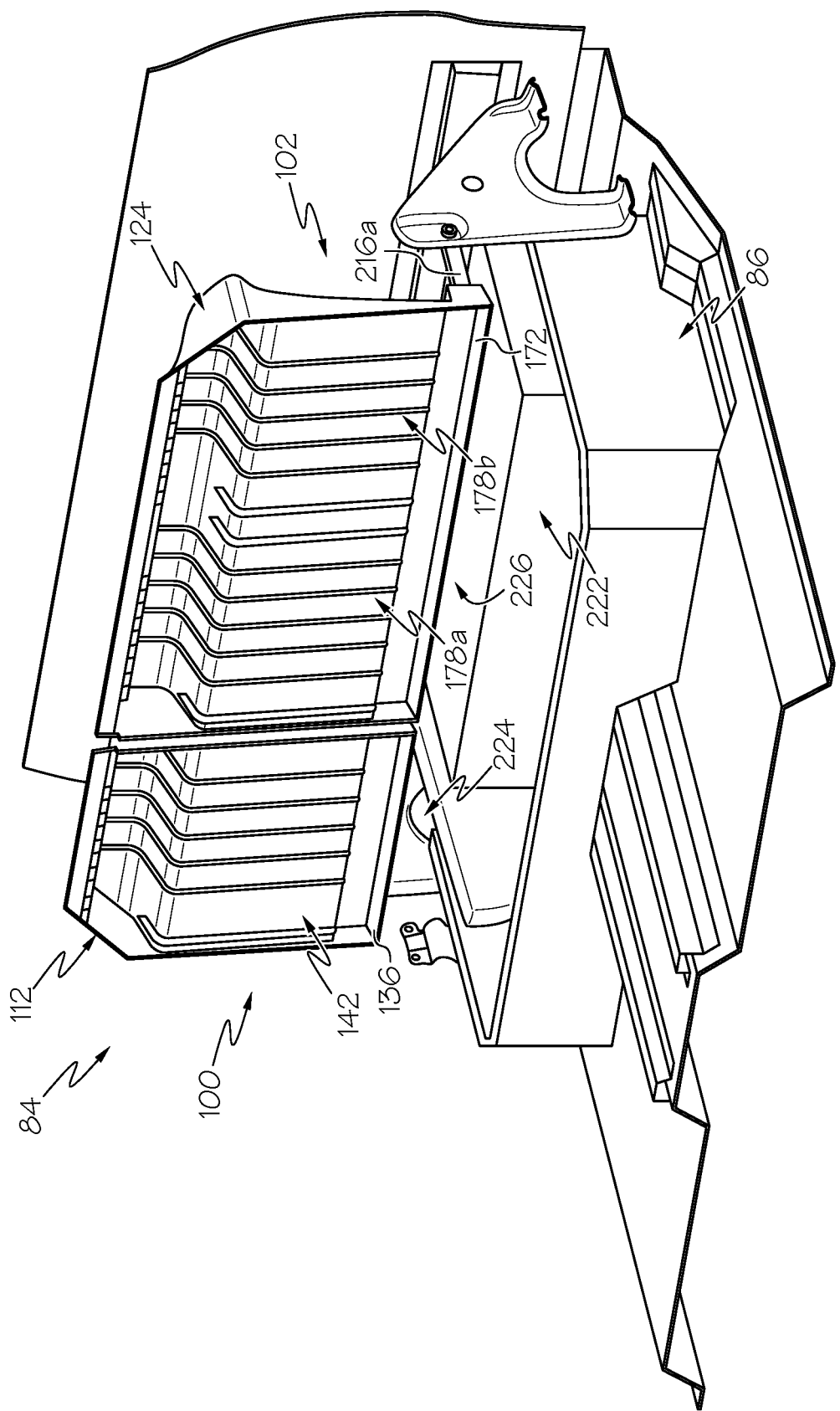
FIG. 5 is another perspective view of the passenger seat assembly of FIG. 3 in an open configuration, according to one or more embodiments shown and described herein.

The adjustable seat portion 84 is illustrated in FIG. 5 in a fully open configuration with each of the first seat 100 and the second seat 102 in their respected open configurations. In the open configuration, the seat base frames 112 and 124 are lifted from the base support assembly 86 and the sitting portions 142, 178a and 178b lie in a generally vertical plane thereby opening the storage volume 222 formed by the base support assembly 86. In the open configuration, the rear edges 136 and 172 of the seat base frames 112 and 124 move vertically away from the base support assembly 86, due to the offset pivot arrangement provided by the pivot linkage arms 214 and 216 providing areas 224 and 226 of increased vertical clearance from the base support assembly 86.

Figure 6:
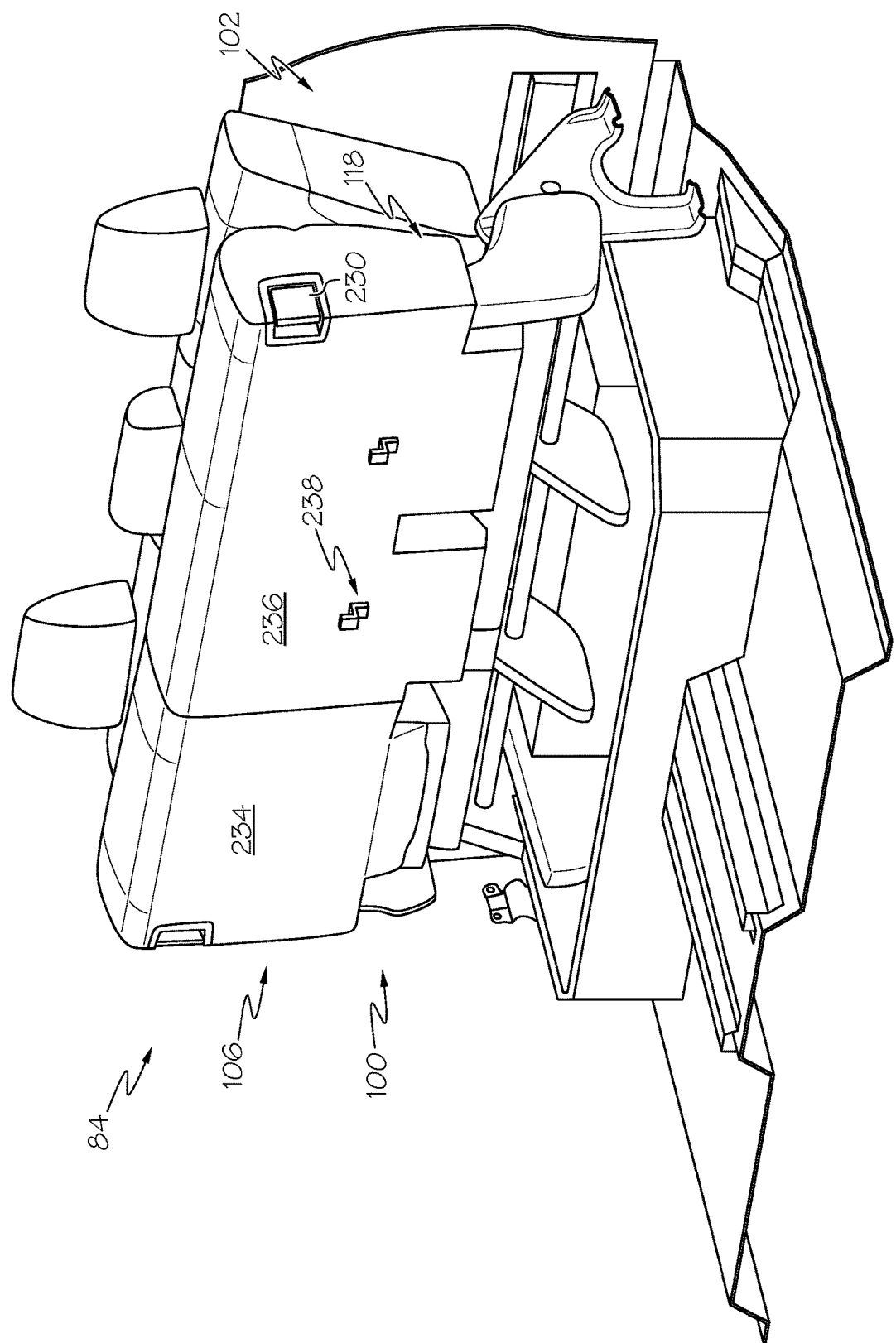
FIG. 6 is another perspective view of the passenger seat assembly of FIG. 2 in the open configuration, according to one or more embodiments shown and described herein.

FIGS. 2 and 6, the adjustable seat portion 84 is illustrated in operation in both the fully closed configuration (FIG. 2) and the fully open configuration (FIG. 6). Referring first to FIG. 2, in the closed configuration, the seat bases 106 and 118 rest on top of the base support assembly 86. Latch devices 230 may be provided as part of the seat bases 106 and 118 that can latch the seat bases 106 and 118 against the base support assembly 86. A handle 232 or other opening mechanism can be provided that can unlatch the seat bases 106 and 118. Each of the first seat 100 and the second seat 102 may have a latch device 230 for operating the first seat 100 and the second seat 102 independently. In some embodiments, the latch devices 230 may have a locking mechanism to lock the seat bases 106, 118 in the closed configuration.

Referring to FIG. 6, the adjustable seat portion 84 is illustrated in the fully open configuration. In the open configuration, bottoms 234 and 236 of the seat bases 106 and 118 are oriented more vertically, while in the closed configuration, the bottoms 234 and 236 of the seat bases 106 and 118 are oriented more horizontally. In some embodiments, hanging features 238 (e.g., hooks) may be provided at the bottoms 234 and 236 that can be used to hang items, such as a bag.

Figure 7:
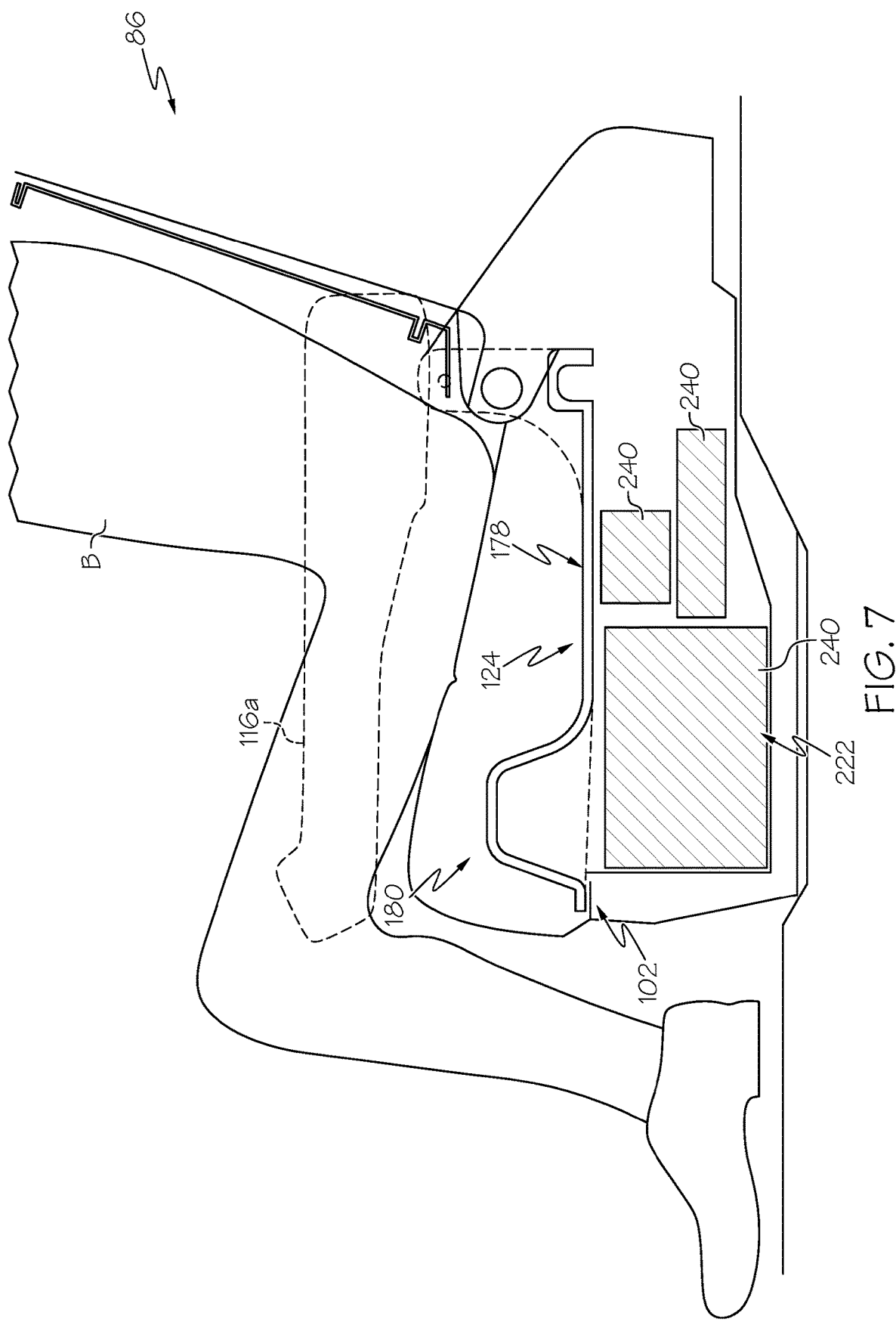
FIG. 7 is a diagrammatic section view of the passenger seat assembly of FIG. 2 in use, according to one or more embodiments shown and described herein.

Referring to FIG. 7, the adjustable seat portion 84 is illustrated diagrammatically in side cross-section to illustrate use of the storage volume 222 and a body form B positioned in the seats 100 and 102. In this example, the second seat 102 is illustrated in the closed configuration thereby closing and inhibiting access to the storage volume 222. Items 240 are located in the storage volume, such as a toolbox, trailer hitch, tools, etc.

As can be seen, the raised portion 180 of the seat base frame 124 provides a support region of increased elevation compared to the sitting portion 178. The raised portion 180 provides support for legs of the body form B that is higher than support provided by the sitting portion 178. This raised support can result in an increase in leg elevation from a hip toward a knee location and provide an anti-submarining feature, as discussed above.

FIG. 7 also shows the seat back 116 in different configurations. The dotted lines 116a illustrate the seat back 116 in a folded over configuration where the seat back 116 folds over the seat base 118.

The above-described seat assemblies provide moveable seat bases that can be moved between open and closed configurations to allow and inhibit access to a storage volume underneath the seat bases. The seat bases include a seat base frame that can be formed as a monolithic piece of reinforced plastic material that includes a raised portion at a front edge of the seat base frame providing an anti-submarining feature. The seat base frame may also include reinforcement features, such as undulating ribs and valleys that can provide the seat base frame with increased structural support without need for an increase in material thickness. The monolithic structure can also lower mass and decrease number of separate parts needed to assembly the seat assemblies.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
    a cabin; and
    a passenger seat assembly located in the cabin and comprising:
    a base support assembly mounted to a floor of the cabin and comprising walls that form a storage compartment;
    a seat supported by the base support assembly, the seat comprising:
        a seat back frame that supports one or more cushions thereon; and
        a seat base frame that supports one or more cushions thereon forming a seat base, the seat base frame having a sitting portion and a raised portion located forward of the sitting portion, the raised portion increasing in elevation above the sitting portion to an apex of increased distance from the floor, the seat base frame including the sitting portion and raised portion formed together as a monolithic, single piece structure from a plastic resin material;
    wherein the raised portion extends across an entire width of the sitting portion and the seat base frame comprises ribs, wherein the ribs each extend continuously from a rear edge to a front edge and over the sitting portion and the raised portion.

2. The vehicle of claim 1, wherein the seat base frame is moveable relative to the base support assembly from a closed configuration that closes the storage compartment and allows for seating and an open configuration that exposes the storage compartment.

3. The vehicle of claim 1, wherein the seat base frame comprises a frame body that includes the front edge, the rear edge and side edges that extend between the front edge and the rear edge, the raised portion located between the sitting portion and the front edge.

4. The vehicle of claim 3, wherein adjacent ribs being separated by valleys forming an undulating, wave-like pattern in a vehicle lateral direction over the sitting portion and the raised portion.

5. The vehicle of claim 4, wherein the ribs extend continuously over the sitting portion and the raised portion.

6. The vehicle of claim 1, wherein the seat is a first seat, the passenger seat assembly including a second seat supported by the base support assembly, the second seat comprising:
a seat back frame that supports one or more cushions thereon; and
a seat base frame that supports one or more cushions thereon forming a second seat base, the seat base frame of the second seat formed as a monolithic, single piece structure from a plastic resin material, the seat base frame of the second seat having a sitting portion and a raised portion located forward of the sitting portion of the second seat, the raised portion of the second seat increasing in elevation above the sitting portion of the second seat to an apex of increased distance from the floor;
wherein the raised portion of the second seat extends across an entire width of the sitting portion of the second seat.

7. The vehicle of claim 6, wherein the first seat is a single occupant seat and the second seat is a multiple occupant seat.

8. The vehicle of claim 6, wherein at least one of the seat bases comprises a hook located at a bottom of the at least one seat base.

9. A passenger seat assembly comprising:
a base support assembly that mounts to a floor of a vehicle cabin, the base support assembly comprising walls that form a storage compartment; and
a seat supported by the base support assembly, the seat comprising:
a seat back frame that supports one or more cushions thereon forming a seat back; and
a seat base frame that supports one or more cushions thereon forming a seat base, the seat base frame having a sitting portion and a raised portion located forward of the sitting portion, the raised portion increasing in elevation above the sitting portion to an apex of increased distance from the floor, the seat base frame including the sitting portion and raised portion formed together as a monolithic, single piece structure from a plastic resin material;
wherein the raised portion extends across an entire width of the sitting portion and the seat base frame comprises ribs, wherein the ribs each extend continuously from a rear edge to a front edge and over the sitting portion and the raised portion.

10. The passenger seat assembly of claim 9, wherein the seat base frame is moveable relative to the base support assembly from a closed configuration that closes the storage compartment and allows for seating and an open configuration that exposes the storage compartment.

11. The passenger seat assembly of claim 9, wherein the seat base frame comprises a frame body that includes the front edge, the rear edge and side edges that extend between the front edge and the rear edge, the raised portion located between the sitting portion and the front edge.

12. The passenger seat assembly of claim 11, wherein adjacent ribs being separated by valleys forming an undulating, wave-like pattern in a vehicle lateral direction over the sitting portion and the raised portion.

13. The passenger seat assembly of claim 12, wherein the ribs extend continuously over the sitting portion and the raised portion.

14. The passenger seat assembly of claim 9, wherein the seat is a first seat, the passenger seat assembly including a second seat supported by the base support assembly, the second seat comprising:
a seat back frame that supports one or more cushions thereon; and
a seat base frame that supports one or more cushions thereon forming a second seat base, the seat base frame having a sitting portion and a raised portion located forward of the sitting portion of the second seat, the raised portion of the second seat increasing in elevation above the sitting portion of the second seat to an apex of increased distance from the floor;
wherein the raised portion of the second seat extends across an entire width of the sitting portion of the second seat.

* * * * *

UNITED STATES PATENT AND TRADEMARK OFFICE
CERTIFICATE OF CORRECTION

| | | |
|---|---|---|
| PATENT NO. | : 11,059,403 B2 | Page 1 of 1 |
| APPLICATION NO. | : 15/982241 | |
| DATED | : July 13, 2021 | |
| INVENTOR(S) | : Vikas Bhatia et al. | |

It is certified that error appears in the above-identified patent and that said Letters Patent is hereby corrected as shown below:

On the Title Page

Column 2, item (56), foreign patent documents, Line 2, delete "1017920B2" and insert --4017920--, therefor.

Column 2, item (56), other publications, Line 2, delete "cnncept" and insert --concept--, therefor.

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*